George H. C. Corner
and Joseph McGinn

Patented Aug. 4, 1936

2,050,160

UNITED STATES PATENT OFFICE 2,050,160

GAS WASHING

George Henry Clifford Corner and Joseph McGinn, Birmingham, England, assignors to Imperial Chemical Industries Limited, a corporation of Great Britain Application April 14, 1932, Serial No. 605,318
In Great Britain April 14, 1931

1 Claim. (Cl. 183—21)

This invention relates to the removal of dust and sulphur compounds from flue gases, especially the gases from pulverized fuel boiler plants, by washing.

According to the invention, in apparatus of the type in which such gas is passed transversely in contact with continuous films of water flowing down the surfaces of vertical baffles, improved efficiency of dust and sulphur compound removal is obtained by providing two or more successive sets of interpenetrating curved baffles, in the line of gas flow, in such a manner that the gas follows a sinuous course in contact with the films of water flowing down the concave surfaces of the baffles, without incurring any sharp changes of direction. The term "set" as used herein in relation to baffle plates means a number of baffle plates arranged side by side across the line of gas flow. Preferably the curvature of the baffles is increased in successive sets in the direction of gas flow so as to cause the gas to be subjected to progressively intenser centrifugal force as the purification proceeds, thus distributing the purification more evenly among the several sets of baffles. If desired, the curvature of the baffles in the final set or sets may be reduced so as to reduce the local gas velocity and avoid entrainment of water, the carrying over of which into the exit duct is undesirable.

Figure 1:
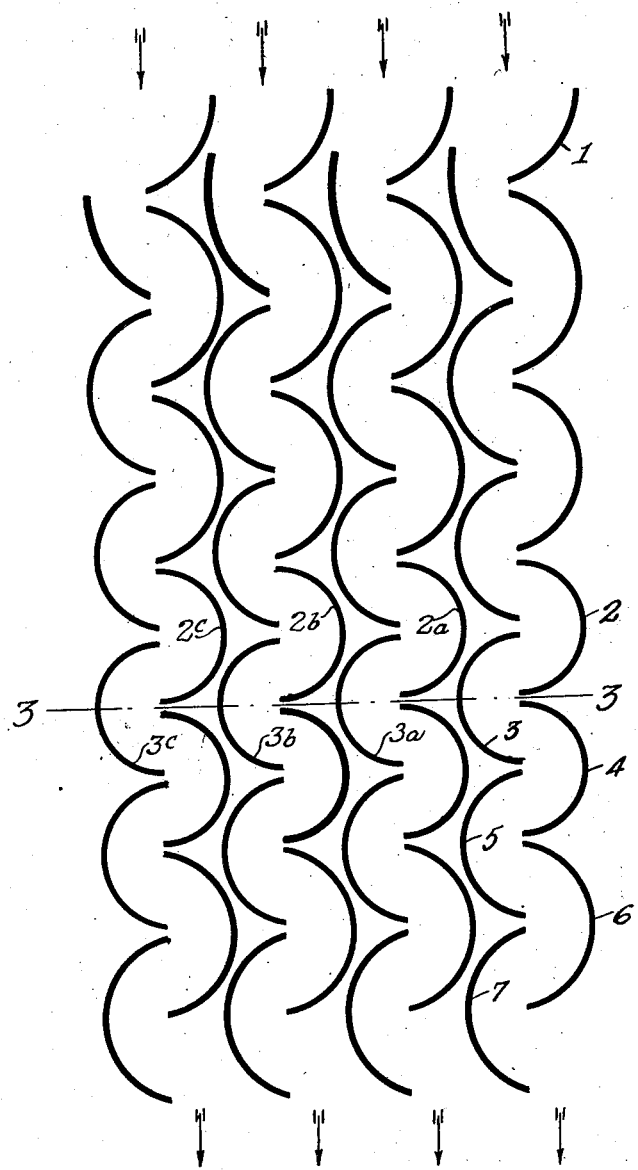
Figure 2:
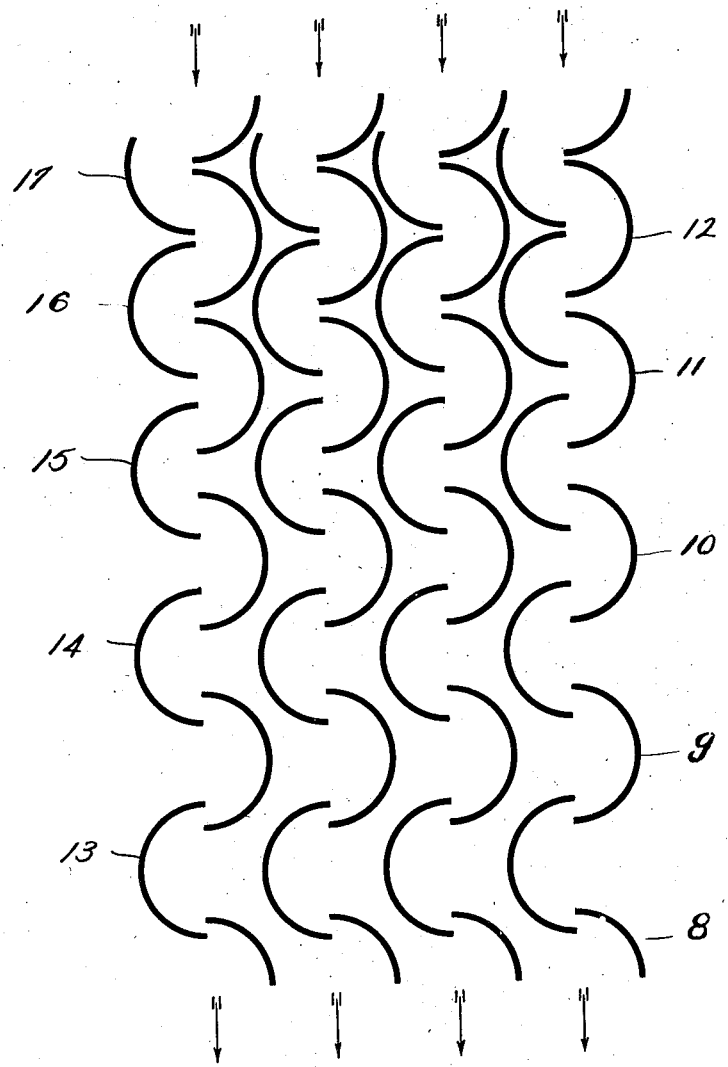
Figure 3:
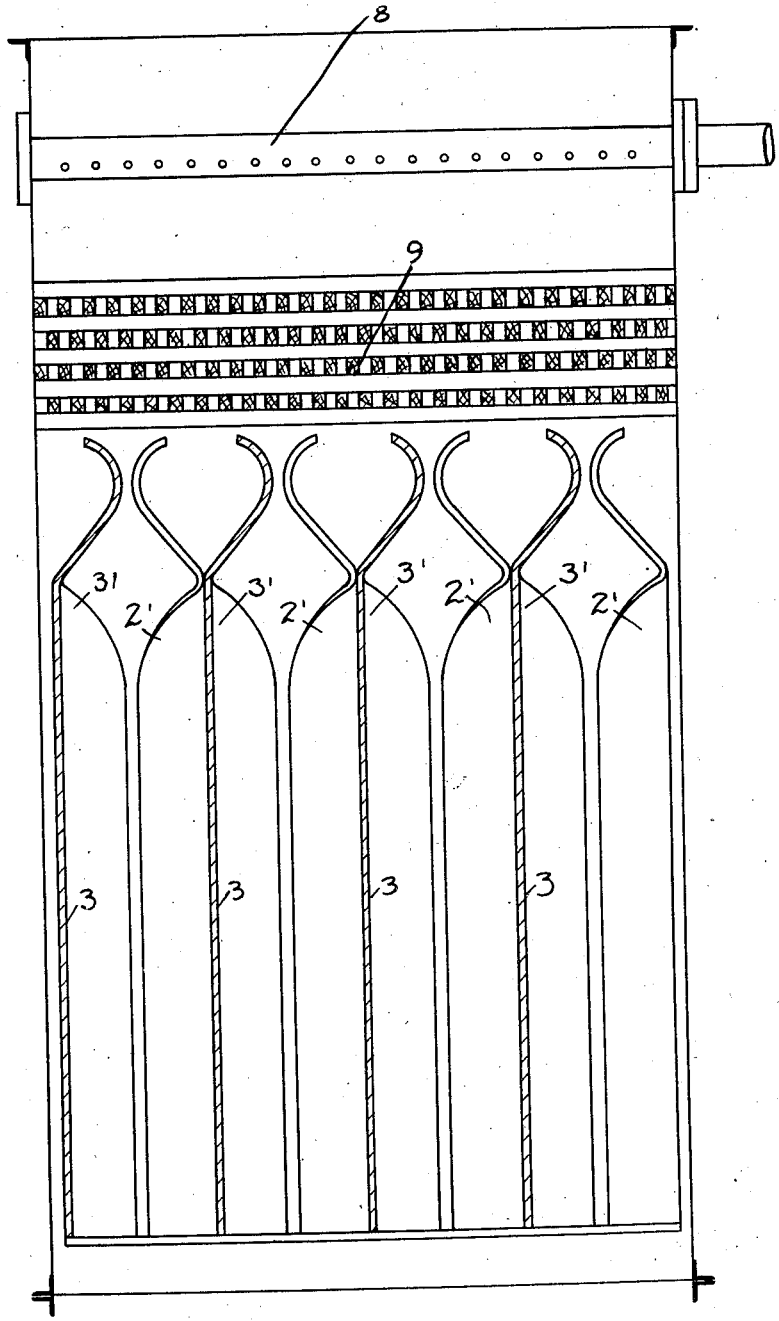

Figures 1 and 2 of the accompanying drawings illustrate, in plan, two arrangements of baffle plates in accordance with the invention. Fig. 3 is a vertical section on the line 3—3 of Fig. 1.

In Figure 1, twelve sets of curved vertical baffle plates are provided with four plates in each set. The plates in each set are spaced 9" apart, this distance being measured along the axis of symmetry of the four plates in each set. The reference numerals 2, 2a, 2b, and 2c denote one set of baffles, and the numerals 3, 3a, 3b, and 3c one of the neighbouring sets of baffles. It will be seen that the plates in neighbouring sets are curved in opposite directions and are staggered, so that corresponding plates of like curvature in alternate sets are brought edge to edge. The curvature of the baffles is increased from the first set 1 in successive sets in the line of gas flow so that the baffles 2, 2a, 2b, and 2c in the central set are approximately semi-circular, the curvature being diminished towards the outlet in the case of the succeeding sets 3, 4, 5, 6 and 7.

The structure shown in Figure 2 differs from that of Figure 1 in that the sets of baffles are progressively spaced further apart in the line of gas flow. The object of this arrangement is to allow the gases from which most of the dust has been removed to leak to the back or convex surfaces of the baffles. In passing any one baffle the solid and liquid particles will be thrown nearer to the concave surface owing to the action of the centrifugal force, and the layers of gas further from the surface will consequently contain a smaller proportion of suspended matter. By the arrangement shown, progressively greater quantities of the gas from which the bulk of the suspended matter has been removed are allowed to by-pass the concave baffle surfaces. In this way the total gas resistance of the apparatus is reduced.

Thus, as shown in Figure 2, the axes of symmetry of the sets of baffles 8 and 9 are spaced apart a substantially greater distance than the corresponding sets of baffles in Figure 1. In Figure 2, the axes of symmetry of sets of baffles 8 and 9 are so spaced that the proximate ends of these baffles interpenetrate baffles 13 near the surface thereof and more remote from the centers than do the corresponding elements in Figure 1. However, the axes of symmetry of baffles 8, 9, 10, 11 and 12 progressively approach each other in the order given as do the axes of symmetry in sets of baffles 13, 14, 15, 16 and 17.

In Figure 3 the four baffles bisected by the section line 3—3 in Figure 1 are indicated by numerals 3. The portions 3' are the concave portions of the same baffles seen in elevation, and 2' are the convex portions of the baffles of the next set also in elevation. The baffles are bent at the top as shown in order to catch the water, which is supplied from a perforated pipe 8 and falls on to a gridwork 9, which distribute it evenly partly over the concave surfaces of the baffles and partly over the convex surfaces.

The baffles may also be arranged in such a manner that the total width of successive sets across the line of gas flow diminishes, the casing in which the baffles are mounted being correspondingly tapered, thus compensating the gas velocity which would otherwise fall as the gases cooled during their passage through the apparatus. The casing has one side open to provide an inlet for the gas and has an opening in the opposite side to provide an outlet. The inlet temperature of the gases may be 200° C., for example, and the exit temperature 80° C.

The baffles may be irrigated with water, hot or cold, or with other suitable washing medium such as dilute alkaline solutions, e. g. lime water or milk of lime, also either hot or cold. The washing medium may be fed to the baffles from overhead sprays or an overhead gridwork or in any other convenient manner. Generally both concave and convex sides of the baffles will be irrigated.

The baffle plates should be made of material resistant to erosion, corrosion and temperature fluctuations, e. g. steel coated with vitreous enamel, or with lead.

We are aware that in apparatus for cleaning air and for removing solid or liquid matter from gases by washing, the gas has been passed through sinuous channels formed by parallel corrugated baffles or by arranging a number of plates or curved baffles edge to edge, but the distinctive feature of the present invention is that the baffles of neighbouring sets interpenetrate, i. e. they are arranged so that the gas is swept directly from the concave surface of each baffle of one set to the concave surface of the next baffle of the adjacent set.

As many apparently widely different embodiments of this invention may be made without departing from the spirit and scope thereof, it is to be understood that we do not limit ourselves to the specific embodiments thereof except as defined in the appended claim.

We claim:—

An apparatus for the removal of dust and sulphur compounds from flue gases by washing, comprising a casing containing a number of vertical baffles arranged in a plurality of sets in the line of gas flow and adapted to cause the gas under treatment to follow a sinuous course without incurring any sharp change of direction, means for causing continuous films of water to flow down the surfaces of said baffles, said casing having one side open to form a gas inlet while the opposite side is open to provide a gas outlet so arranged that the gas under treatment flows transversely in contact with said films of water, said baffles having a concave and a convex surface and being so placed that a progressively increasing proportion of gas is allowed to flow over the convex sides of the baffles while the remainder of the gas is swept directly from the concave surface of each baffle to the concave surface of a baffle in the succeeding set.

GEORGE H. C. CORNER.
JOSEPH McGINN.